United States Patent
Kougo

(10) Patent No.: US 6,914,104 B2
(45) Date of Patent: Jul. 5, 2005

(54) PROCESS FOR POLYMERIZATION OF α-OLEFIN

(75) Inventor: Katsutoshi Kougo, Chiba (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 10/816,895

(22) Filed: Apr. 5, 2004

(65) Prior Publication Data

US 2004/0230014 A1 Nov. 18, 2004

Related U.S. Application Data

(63) Continuation-in-part of application No. 10/414,025, filed on Apr. 16, 2003, now abandoned.

(30) Foreign Application Priority Data

Apr. 19, 2002 (JP) .................................. 2002-117277

(51) Int. Cl.$^7$ ................................................ C08F 2/34
(52) U.S. Cl. ............................ 526/65; 526/66; 526/901
(58) Field of Search ..................... 526/65, 66, 901, 526/919

(56) References Cited

U.S. PATENT DOCUMENTS

| | | |
|---|---|---|
| 3,514,501 A | 5/1970 | Leibson et al. |
| 4,048,412 A | 9/1977 | Caumartin et al. |
| 4,390,669 A | 6/1983 | Morita et al. |
| 4,420,592 A | 12/1983 | Kato et al. |
| 4,495,337 A | 1/1985 | Raufast |
| 4,621,952 A | 11/1986 | Aronson |
| 4,703,094 A | 10/1987 | Raufast |
| 5,116,940 A | 5/1992 | Eisinger |
| 5,171,541 A | 12/1992 | Raufast |
| 5,461,123 A | 10/1995 | Song et al. |
| 5,633,333 A | 5/1997 | Chinh |
| 5,728,353 A | 3/1998 | Govoni et al. |
| 5,928,612 A | 7/1999 | Chinh |
| 5,939,027 A | 8/1999 | Ruelle |
| 6,135,317 A | 10/2000 | Ruelle et al. |
| 6,180,729 B1 | 1/2001 | Lange et al. |
| 6,284,848 B1 | 9/2001 | Durand et al. |
| 6,348,635 B1 | 2/2002 | Herzog |
| 6,362,290 B2 | 3/2002 | Durand et al. |
| 6,407,184 B1 | 6/2002 | Matsuda et al. |
| 6,476,161 B1 | 11/2002 | Harlin et al. |
| 2001/0037004 A1 | 11/2001 | Durand et al. |

FOREIGN PATENT DOCUMENTS

| | | |
|---|---|---|
| EP | 0 728 772 A1 | 8/1996 |
| EP | 0 855 411 A1 | 7/1998 |
| EP | 0 870 539 A2 | 10/1998 |
| JP | 59-176305 A | 10/1984 |
| JP | 3-153708 A | 7/1991 |
| JP | 11-118342 A | 5/1995 |
| JP | 8-169915 A | 7/1996 |
| JP | 10-279612 A | 10/1998 |
| JP | 11-246608 A | 9/1999 |
| JP | 2000-53707 A | 2/2000 |
| WO | WO 00/29452 A1 | 5/2000 |

OTHER PUBLICATIONS

Abstract of JP 57–59904 (Sumitomo Chem. Co. Ltd.), Apr. 10, 1982, World Patent Index (online), London, U.K.: Derwent Publication Ltd. (retrieved on Jun. 30, 2004) retrieved from EPO Database, DW 198220, Accession No. 1982–40423E [20].

Abstract of JP 57–59905 (Sumitomo Chem. Co. Ltd.), Apr. 10, 1982, World Patent Index (online), London, U.K.: Derwent Publication Ltd. (retrieved on Jun. 30, 2004) retrieved from EPO Database, DW 198220, Accession No. 1982–40424E [20].

Abstract of JP 57–59906 (Sumitomo Chem. Co. Ltd.), Apr. 10, 1982, World Patent Index (online), London, U.K.: Derwent Publication Ltd. (retrieved on Jun. 30, 2004) retrieved from EPO Database, DW 198220, Accession No. 1982–40425E [20].

Abstract of JP 62–06917 (Mitsui Petrochem Ind Co Ltd), Jul. 26, 1994, World Patent Index (online), London, U.K.: Derwent Publication Ltd. (retrieved on Jun. 30, 2004) retrieved from EPO Database, DW 199434, Accession No. 1994–275896 [34].

*Primary Examiner*—Fred Teskin
(74) *Attorney, Agent, or Firm*—Sughrue Mion, PLLC

(57) ABSTRACT

The object of the present invention is to provide a polyolefin polymerization method which prevents fine particles of polymer from scattering from a fluidized bed in a gas phase polymerization reactor. This object is achieved by a process for polymerization of α-olefin in multi-stage polymerization process and in at least two serially arranged polymerization reactors including a gas phase polymerization reactor, the process comprising;

drawing out polyolefin particles from a polymerization reactor, and transferring the polyolefin particles into the interior of fluidized bed of a gas phase polymerization reactor of the next stage.

5 Claims, 1 Drawing Sheet

PROCESS FOR POLYMERIZATION OF α-OLEFIN

This is a Continuation-In-Part of application Ser. No. 10/414,025 filed Apr. 16, 2003, now abandoned; the disclosure of which is incorporated herein by reference.

FIELD OF THE INVENTION

The present invention relates to a gas phase polymerization process of polyolefin, and more specifically to a transferring method of polymer particles between reactors.

BACKGROUND OF THE INVENTION

A gas phase polymerization process of polyolefin is usually conducted by a plurality of polymerization reactors which are serially and continuously connected, and polymer particles that have polymerized and grown in a reactor are then sequentially transferred to the next reactor as the polymerization proceeds, and finally particles having a uniform degree of polymerization are produced. As such a plurality of serially succeeding polymerization reactors, those consisting of gas phase polymerization reactors over the entire process, as well as those consisting of the first half of the process of the solvent polymerization method or bulk polymerization method using stirred tank reactors, or bulk polymerization method using loop reactors and the second half of the process using gas phase polymerization reactors have been known.

In a gas phase polymerization reactor, reactive olefin gas is circulated and forming a fluidized bed with polymer particles. Since the circulating gas is carrying fine polymer particles, the circulating gas is usually circulated after the fine polymer particles are separated the circulating gas by a cyclone disposed in the upper part of the reactor. However, the polymer fine particles may stay in the separating cyclone to agglomerate or come with the circulating gas into the circulating gas line and adhere to the inside of the piping, or stay on the inner surface of the heat exchanger to cause a clogging, or cause a clogging of the fluidization grid of the reactor. Once clogging occurs, it is necessary to stop the polymerization, dismount the circulating gas line and the like and remove the polymer clogging therein, resulting into the reduction in production amount and stopping of the reaction, and consequently, it is difficult to operate stably polymerization for a long time.

As an attempt to avoid such problems, Japanese Patent No JP 8-169915A (1996) discloses a cleaning method of adhered particles by sonic cleaning. However, it required enormous facilities to install sonic cleaners for every region where the fine particles of polymer coming with the circulating gas adhere. Japanese Patent Application No. JP 11-246608A (1999) discloses a method for preventing polymer powder from depositing in a circulating gas line by feeding a catalyst poison to the line, however, this method also caused another problem that, since the circulating gas containing the catalyst poison is fed continuously into the reactor, the circulating gas hindered the progress of the reaction. In addition, Japanese Patent Application No. JP 10-279612A (1998) discloses a method of reducing the amount of fine polymer particles coming with the circulating gas by designing the height of the fluidized bed as almost the same as the height of the polymerization reactor. However, in a multi stage polymerization, since the retention time, which is an important factor for determining the polymerization amount in the each reactor, is determined by the height of the fluidized bed, there was a problem that control of polymerization ratio of each reactor for controlling physical properties was restricted.

SUMMARY OF THE INVENTION

In view of the above situation, it is an object of the present invention to provide a polyolefin polymerization method which prevents fine particles of polymer from scattering from a fluidized bed in a gas phase polymerization reactor.

That is, the present invention provides a process for polymerization of α-olefin in multi-stage polymerization process and in at least two serially polymerization reactors including a gas phase polymerization reactor, the process comprising;

drawing out polyolefin particles from a polymerization reactor, and transferring the polyolefin particles into the interior of fluidized bed of a gas phase polymerization reactor of the next stage, and into lower than a half of height from the bottom to the surface of the fluidized bed.

EXPLANATION OF REFERENCE NUMERALS

Figure 1:
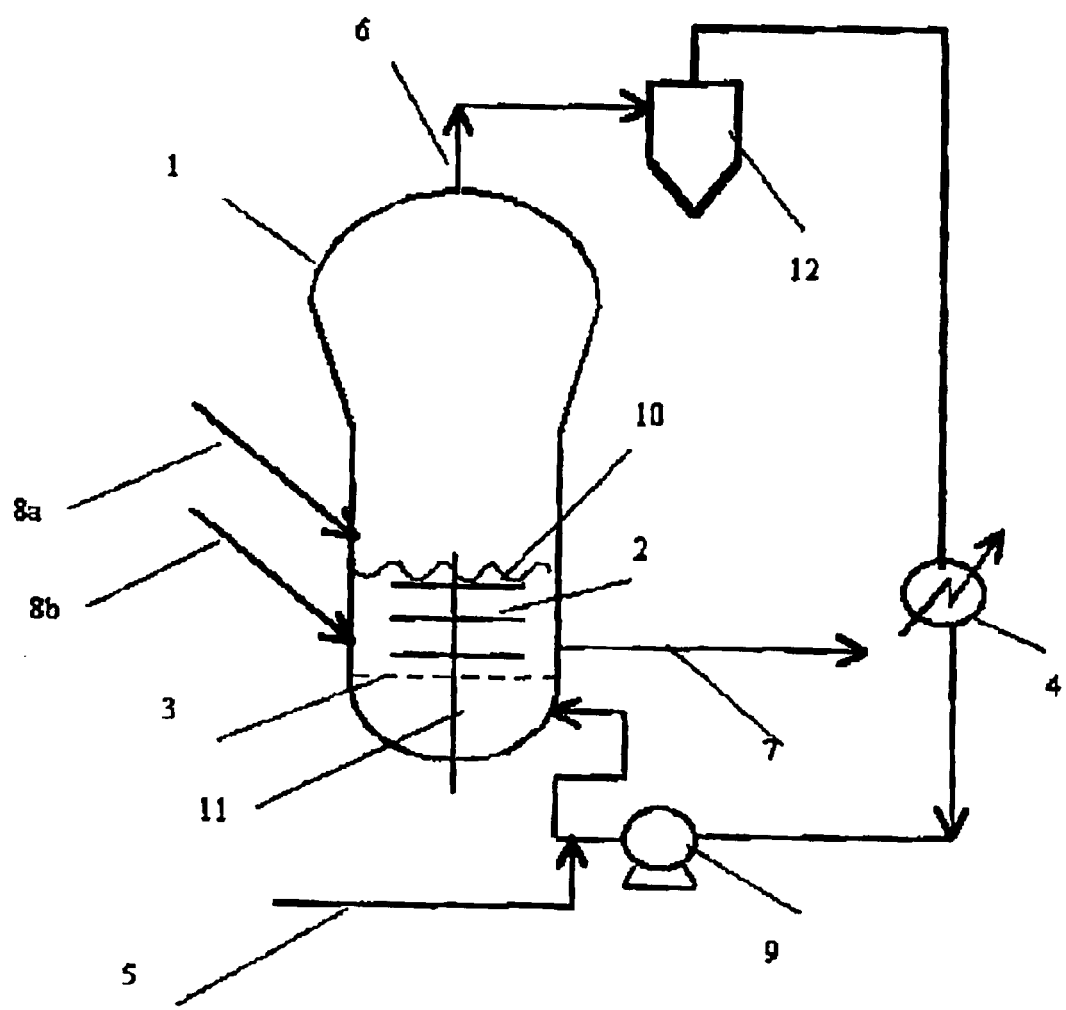
FIG. 1 A view showing a process of the third gas phase polymerization reactor in Example 1.

1 Third gas phase polymerization reactor
2 Fluidized bed
3 Fluidization grid
4 Heat exchanger
5 Raw gas supply line
6 Gas circulating line
7 Line for drawing out to next step
8a Transferring pipe leading from second gas phase polymerization reactor (previous stage) to over fluidized bed in third gas phase polymerization reactor
8b Transferring pipe leading from second gas phase polymerization reactor (previous stage) to interior of fluidized bed in third gas phase polymerization reactor (next stage)
9 Circulating gas compressor
10 Surface of fluidized bed
11 Stirrer
12 Separating cyclone

DETAILED DESCRIPTION OF THE PRESENT INVENTION

In the following, the present invention will be described in detail by exemplifying polymerization of polypropylene.

The present invention is a process for polymerization of α-olefin in a polyolefin polymerization process in at least two serially arranged polymerization reactors including a gas phase polymerization reactor, a multi stage polymerization is conducted in such a manner that polyolefin polymer particles are drawn out from a polymerization reactor of the previous stage and fed into the interior of fluidized bed of a gas phase polymerization reactor of the next stage.

The reaction of the polymerization in the previous stage may be employed any reaction such as the solvent polymerization reaction, the bulk polymerization reaction and the gas phase polymerization reaction, and the gas phase polymerization reaction is preferable. The type of the polymerization reactor may include any of the stirring blade tank type, loop type, vapor fluidized bed type and the like, and the polymerization reaction of the vapor fluidized bed type may include various types of reactors having fluidized bed such as a vapor fluidized bed reactor not having a stirrer and performing stirring with air flow, and a stirring fluidized bed type reactor using a stirrer together with stirring with air flow.

Polymer particles that have been drawn out from the polymerization reactor of the previous stage are then transferred into the interior of fluidized bed of the gas phase polymerization reactor of the next stage. Further, polymer particles that have been drawn out from the polymerization reactor of the previous stage are transferred into lower than a half of height from the bottom to the surface of the fluidized bed of the gas phase polymerization reactor of the next stage. These allow the transferred polymer particles to sufficiently stay in the fluidized bed, so that it is possible to prevent the fine polymer particles from coming with the circulating gas, from staying and agglomerating in the gas separation cyclone, from adhering to the interior of the piping due to coming with the circulating gas line, as well as from staying and clogging to the inner surface of the heat exchanger, from clogging of the fluidization grid and so on.

In the present invention, the term "fluidized bed" refers to a layer which maintains such a condition that solid particles are held by a fluid, and a group of particles forms a thick phase, and the weight of the particles balances with the drag of the fluid acting on the particles. That is, a fluidized bed refers to the region where particles do not come with a circulating gas. Hereinafter, the region where particles come with a circulating gas is often called as a gas phase region.

The interior of the fluidized bed of the present invention into which the drawn out polymer particles are transferred is in the fluidized bed from the boundary plane between the above fluidized bed and the gas phase part, and its position from the wall surface of the gas phase polymerization reactor is not particularly limited. From the view that the polymer particles can be always transferred to the interior of fluidized bed even when the position of the boundary plane changes more or less, the hight into which the drawn out polymer particles are transferred is a half height from the bottom to the surface of the fluidized bed, preferably lower than one-third height, more preferably lower than one-fourth height, and further preferably lower than one-fifth height. The surface of the fluidized bed means the boundary plane between the fluidized bed and the gas phase part. The bottom of the fluidized bed is usually regarded as a fluidization grid. If the boundary plane changes more or less, the surface of the fluidized bed is regarded as the lowest level of the boundary.

Examples of transferring means between polymerization reactors include, but not limited to, a method wherein transferring pipe is provided between reactors and continuous transferring is conducted by using the pressure gradient between the polymerization reactors, a method wherein a valve is provided on the pipe and intermittent transferring is conducted by opening and closing the valve every certain time, and a method wherein intermittent transferring is conducted by pressurizing again with a monomer gas and the like after drawing out to a purge tank. Among above methods, the intermittent transfer is preferable, and a method wherein a valve is provided on the pipe and intermittent transferring is conducted by opening and closing the valve every certain time is more preferable.

In transferring to the interior of fluidized bed of the gas phase polymerization tank of the next stage, it is conventionally to transfer to a position higher than the fluidized bed from the viewpoint that the polymer particles forming the fluidized bed will flow back to the transferring pipe. For implementing the present invention in which polymer particles is transferred into the interior of fluidized bed, it is preferable to prevent the polymer particles from flowing back by the method such as purging with a monomer gas.

The present invention can be conducted under usual conditions of α-olefin polymerization. Besides homo-polymerization of propylene, the present invention is effective for block co-polymerization of propylene-ethylene, random co-polymerization of propylene-ethylene, co-polymerization of propylene-butene, ter-polymerization of propylene-ethylene-butene, production of linear low-density polyethylene or the like.

As the monomer and comonomer, α-olefins having 2 to 8 carbons are used. For example, the monomer may include ethylene, propylene and the like, and the comonomer may include ethylene, propylene, 1-butene, hexene, and the like. The polymerization temperature should be the melting point of the generated polymer or less, and is, for example, in the range of about 30 to about 150° C., and preferably in the range of about 60 to about 90° C., and the pressure is, for example, in the range of about 0.5 to about 6 MPaG, and preferably in the range of about 1 to about 3 MPaG.

As the catalyst component, titanium-containing solids and organic aluminum compounds can be used as the catalyst. As the titanium-containing solid catalyst component, titanium tetrachloride, titanium tetrabromide, ethoxytitanium trichloride, butoxytitanium trichloride and the like are exemplified. Titanium tetrachloride is preferably used.

As the organic aluminum compound, trialkyl aluminums such as trimethyl aluminum, triethyl aluminum, triisobutyl aluminum and trihexyl aluminum, alkyl aluminum halides such as diethyl aluminum chloride, diisobutyl aluminum chloride and ethyl aluminum sesquichloride, aluminum alkoxides such as diethyl aluminum ethoxide and diethyl aluminum butoxide, and mixtures thereof can be used.

EXAMPLE

A example will now be made with reference to FIG. 1 which shows an example of co-polymerization of propylene-ethylene. It is to be noted that the present invention is not limited to this Example.

Example 1

An experiment was conducted using a polypropylene gas phase polymerization process consisting of a first gas phase polymerization reactor, a second gas phase polymerization reactor and a third gas phase polymerization reactor. FIG. 1 shows a process of the third gas phase polymerization reactor. The reference numeral 8a represents pipe for transferring the polymer particles drawn out from the previous stage (second gas phase polymerization reactor) to over the fluidized bed (a gas phase region) of the third gas phase polymerization reactor, and the reference numeral 8b represents pipe for transferring the polymer particles drawn out from the previous stage (second gas phase polymerization reactor) to the interior of the fluidized bed of the third gas phase polymerization reactor. The third gas phase polymerization reactor has an inside diameter of 3500 mm, and the pipe 8a and the pipe 8b are placed so as to transfer the polymer particles into the position at a height of 12000 mm from the fluidization grid in the gas phase region on the fluidized bed, and into the position at a height of 650 mm in the interior of the fluidized bed, respectively.

The transferring method of polymer particles between polymerization reactors in the present experiment was conducted in the manner of using transferring pipe arranged between the reactors, providing a valve in the pipe and opening/closing the Valve every certain time, and achieving intermittent transferring by the pressure gradient between the polymerization reactors. For achieving the above, in order to prevent the polymer forming fluidized bed of the third gas phase polymerization tank from flowing back into the transferring pipe when the valve is closed, the pipe 8b for transferring into the interior of the fluidized bed is provided with a line for purging with the gas through a line branching from the outlet of a circulating gas compressor of the third gas phase polymerization tank.

Polymerization was performed for each of Grade A (melt index: 3.2 [g/10 min], ethylene content: 8 [wt %]) and Grade B (melt index: 16 [g/10 min], ethylene content: 7 [wt %]), and for each case, the amount of fine powder of scattering polymer separated by a separating cyclone 12 disposed in a circulating gas line 6 of the third gas phase polymerization reactor was measured. A surface 10 of the fluidized bed at this time was about 4000 mm in height from a fluidization grid 3. The measurement results are shown in Table 1. These results show that by transferring the polymer particles to the interior of the fluidized bed, it is possible to reduce the amount of fine powder of the polymer particles scattering from the third gas phase fluidized bed reactor to from 1/5 to 1/10 compared to the case where the polymer particles are transferred into the gas phase part.

TABLE 1

| Grade | Gas amount (Nm³/hr) | Transferring destination | Amount of scattered fine powder (kg/hr) |
| --- | --- | --- | --- |
| A | 9300 | Over fluidized bed | 3.0 |
|   |      | Interior fluidized bed | 0.58 |
| B | 9300 | Over fluidized bed | 2.0 |
|   |      | Interior fluidized bed | 0.2 |

In a multi-stage polyolefin polymerization process, by a method of transferring polyolefin polymer particles from a polymerization reactor of the previous stage to the interior of fluidized bed of a gas phase polymerization reactor of the next stage, it is possible to provide a polyolefin polymerization method capable of preventing polymer fine particles from scattering from the fluidized bed in the gas phase polymerization reactor.

What is claimed is:

1. A process for polymerization of α-olefin in multi-stage polymerization process and in at least two serially arranged polymerization reactors including a gas phase polymerization reactor, the process comprising;

drawing out polyolefin particles from a polymerization reactor, and transferring the polyolefin particles into the interior of fluidized bed of a gas phase polymerization reactor of the next stage, and into lower than a half of height from the bottom to the surface of the fluidized bed, wherein the polymerization reactor is a gas phase reactor.

2. The process according to claim 1, wherein α-olefin is at least one selected from the group consisting of α-olefins having from 2 to 8 carbon atoms.

3. The process according to claim 1, wherein transferring into lower than one-fifth of height from the bottom to the surface of the fluidized bed.

4. The process according to claim 1, wherein transferring is intermittently transferring.

5. The process according to claim 4, wherein the intermittent transferring is conducted by opening and closing a valve.

* * * * *